United States Patent
Grill et al.

(10) Patent No.: US 10,805,377 B2
(45) Date of Patent: Oct. 13, 2020

(54) CLIENT DEVICE TRACKING

(71) Applicant: Cisco Technology, Inc., San Jose, CA (US)

(72) Inventors: Martin Grill, Prague (CZ); Jan Kohout, Roudnice nad Labem (CZ); Martin Kopp, Beroun (CZ)

(73) Assignee: CISCO TECHNOLOGY, INC., San Jose, CA (US)

(*) Notice: Subject to any disclaimer, the term of this patent is extended or adjusted under 35 U.S.C. 154(b) by 185 days.

(21) Appl. No.: 15/598,541

(22) Filed: May 18, 2017

(65) Prior Publication Data

US 2018/0337831 A1 Nov. 22, 2018

(51) Int. Cl.
*H04L 29/08* (2006.01)
*H04W 12/06* (2009.01)
*H04W 12/00* (2009.01)
*H04L 29/06* (2006.01)
*H04L 12/26* (2006.01)

(52) U.S. Cl.
CPC .......... *H04L 67/02* (2013.01); *H04L 63/1425* (2013.01); *H04L 67/303* (2013.01); *H04W 12/0027* (2019.01); *H04W 12/06* (2013.01); *H04L 43/065* (2013.01)

(58) Field of Classification Search
CPC ... H04L 67/02; H04L 63/1425; H04L 67/303; H04L 43/065; H04W 12/06; H04W 12/0027
See application file for complete search history.

(56) References Cited

U.S. PATENT DOCUMENTS

| 7,383,333 | B2 | 6/2008 | Philyaw et al. |
| 7,403,978 | B2 | 7/2008 | Parekh et al. |
| 7,600,020 | B2 | 10/2009 | Busch et al. |
| 7,698,377 | B2 | 4/2010 | Parekh et al. |
| 7,853,939 | B2 * | 12/2010 | Kato .................. G06F 8/61 717/158 |

(Continued)

OTHER PUBLICATIONS

Zhang et al., "Understanding Bag-of-Words: A Statistical Framework", 16 pages (Aug. 2010).

(Continued)

*Primary Examiner* — Patrice L Winder
(74) *Attorney, Agent, or Firm* — Edell, Shapiro & Finnan, LLC

(57) ABSTRACT

A computing device having connectivity to a network stores one or more existing device models, where each of the one or more existing device models is a representation of a different client device used by a first authenticated user to access the network. The computing device obtains a device sample, which comprises network traffic data that is captured during a period of time and which is generated by a particular client device associated with the authenticated user of the network. The computing device determines, based on one or more relational criteria, whether the device sample should be assigned to one of the one or more existing device models or to an additional device model that has not yet been created. The computing device then determines relative identity of the particular client device based on whether the device sample is assigned to one of the one or more device models or to an additional device model that has not yet been created.

20 Claims, 4 Drawing Sheets

(56) References Cited

U.S. PATENT DOCUMENTS

| | | | | |
|---|---|---|---|---|
| 8,060,874 | B2* | 11/2011 | Rengarajan | G06F 8/65 717/168 |
| 8,224,308 | B1* | 7/2012 | Gavrylyako | H04L 67/02 455/405 |
| 8,463,942 | B2 | 6/2013 | Parekh et al. | |
| 8,661,119 | B1 | 2/2014 | Jindal et al. | |
| 8,745,269 | B2 | 6/2014 | Parekh et al. | |
| 8,789,171 | B2 | 7/2014 | Osipkov et al. | |
| 8,869,245 | B2* | 10/2014 | Ranganathan | G06F 21/33 455/12.1 |
| 8,918,903 | B1 | 12/2014 | Schepis et al. | |
| 8,935,381 | B2* | 1/2015 | Kalavade | G06Q 10/0637 709/224 |
| 9,003,012 | B2 | 4/2015 | Balasubramanian et al. | |
| 9,003,488 | B2* | 4/2015 | Spencer | H04W 8/22 726/3 |
| 9,135,293 | B1* | 9/2015 | Kienzle | G06F 16/245 |
| 9,313,646 | B2* | 4/2016 | Baldwin | H04W 8/18 |
| 9,455,872 | B2* | 9/2016 | Lingen | G06F 11/3006 |
| 9,462,441 | B2* | 10/2016 | Dowlatkhah | G06Q 50/01 |
| 9,491,187 | B2* | 11/2016 | Sridhara | H04L 63/1408 |
| 9,589,280 | B2* | 3/2017 | Milton | G06Q 30/0269 |
| 9,608,904 | B2* | 3/2017 | Loach | H04L 45/74 |
| 9,686,023 | B2* | 6/2017 | Sridhara | H04B 17/391 |
| 9,699,490 | B1* | 7/2017 | Japp | H04N 21/251 |
| 9,703,953 | B2* | 7/2017 | Turgeman | G06F 21/554 |
| 9,753,796 | B2* | 9/2017 | Mahaffey | H04L 41/142 |
| 9,779,423 | B2* | 10/2017 | Turgeman | G06Q 30/0275 |
| 9,854,057 | B2* | 12/2017 | Chari | H04L 67/303 |
| 9,936,388 | B2* | 4/2018 | Stan | H04L 67/12 |
| 10,019,744 | B2* | 7/2018 | Adjaoute | G06Q 30/0609 |
| 10,038,968 | B2* | 7/2018 | Milton | G06Q 30/0269 |
| 10,068,027 | B2* | 9/2018 | Qiu | G06F 16/29 |
| 10,091,312 | B1* | 10/2018 | Khanwalkar | H04L 67/22 |
| 10,098,057 | B2* | 10/2018 | Yun | H04L 67/303 |
| 10,110,435 | B2* | 10/2018 | Palanciuc | H04L 41/0893 |
| 10,110,511 | B2* | 10/2018 | Miller | G06F 16/9537 |
| 10,116,536 | B2* | 10/2018 | Palanciuc | H04L 43/08 |
| 10,129,271 | B2* | 11/2018 | Mrkos | H04L 63/1416 |
| 2007/0268515 | A1* | 11/2007 | Freund | H04L 67/34 358/1.15 |
| 2011/0238826 | A1* | 9/2011 | Carre | H04L 41/5009 709/224 |
| 2012/0042067 | A1* | 2/2012 | Gerstenfeld | H04L 67/22 709/224 |
| 2012/0317266 | A1* | 12/2012 | Abbott | G06Q 30/0278 709/224 |
| 2013/0124309 | A1 | 5/2013 | Traasdahl et al. | |
| 2013/0139263 | A1* | 5/2013 | Beyah | H04L 63/1408 726/23 |
| 2014/0089491 | A1 | 3/2014 | Nadler et al. | |
| 2014/0122386 | A1 | 5/2014 | Nahum et al. | |
| 2015/0142564 | A1* | 5/2015 | Lissack | G06Q 30/0255 705/14.53 |
| 2016/0155128 | A1* | 6/2016 | Desai | G06Q 20/4016 705/44 |
| 2016/0182657 | A1 | 6/2016 | Mukherjee et al. | |
| 2016/0352760 | A1 | 12/2016 | Mrkos et al. | |
| 2018/0013843 | A1* | 1/2018 | Roberts | H04L 67/22 |
| 2018/0114243 | A1* | 4/2018 | Huang | G06Q 30/0631 |
| 2018/0165431 | A1* | 6/2018 | Neumann | G06F 21/316 |
| 2018/0270229 | A1* | 9/2018 | Zhang | H04L 63/0876 |

OTHER PUBLICATIONS

Karen Spärck Jones, "A statistical interpretation of term specificity and it's application in retrieval", reprinted from Journal of Documentation, vol. 60, No. 5, 2004, pp. 493-502, Copyright © MCB University Press, ISSN 0022-0418; and previously from Journal of Documentation, vol. 28, No. 1, 1972, pp. 11-21, 9 pages.

Harold W. Kuhn, "Chapter 2: The Hungarian Method for the Assignment Problem", article originally appeared in Naval Research Logistics Quarterly 2 (1955) pp. 83-97, 19 pages.

Salton et al., "A Vector Space Model for Automatic Indexing", Communications of the ACM, Nov. 1975, vol. 18, No. 11, pp. 613-620, 8 pages.

Turney et al., "From Frequency to Meaning: Vector Space Models of Semantics", Journal of Artificial Intelligence Research 37 (2010), Feb. 2010, pp. 141-188, 48 pages.

Abramson, et al., "User Authentication from Web Browsing Behavior," Proceedings of the Twenty-Sixth International Florida Artificial Intelligence Research Society Conference, May 2013, pp. 268-273.

Chen, et al., "COWES: Web User Clustering Based on Evolutionary Web Sessions," Data & Knowledge Engineering, vol. 68, May 2009, pp. 867-885.

Mobasher, et al., "Discovery and Evaluation of Aggregate Usage Profiles for Web Personalization," Data Mining and Knowledge Discovery, vol. 6, Issue 1, Jan. 2002, pp. 61-82.

Yang, et al.,"Toward user patterns for online security: Observation time and online user identification," Decision Support Systems, vol. 48, Issue 4, Mar. 2010, pp. 548-558.

Evangelista, et al., "Data Fusion for Outlier Detection through Pseudo-ROC Curves and Rank Distributions," International Joint Conference on Neural Networks (IJCNN '06), Jul. 2006, pp. 2166-2173.

Robertson, "Understanding Inverse Document Frequency: On theoretical arguments for IDF," Journal of Documentation, vol. 60, No. 5, Oct. 2004, pp. 503-520.

Abramson, "Learning Temporal User Profiles of Web Browsing Behavior," 2014 Ase Bigdata/Socialcom/Cybersecurity Conference, May 2014, pp. 1-8.

Brown, et al., "An exploration of user recognition on domestic networks using NetFlow records," 2014 ACM International Joint Conference on Pervasive and Ubiquitous Computing Adjunct Publication (Ubicomp '14 Adjunct), Sep. 2014, pp. 903-910.

Kumpošt, et al., "User Profiling and Re-identification: Case of University-Wide Network Analysis," 6th International Conference on Trust, Privacy & Security in Digital Business (Trustbus 2009), Sep. 2009, pp. 1-10.

Yang, "Web user behavioral profiling for user identification," Decision Support Systems, vol. 49, Issue 3, Jun. 2010, pp. 261-271.

D. Herrmann, et al., "Behavior-based Tracking: Exploiting Characteristic Patterns in DNS Traffic", Computers & Security, vol. 39, Part A, Nov. 2013, 34 pages.

T. Komárek, et al., "Passive NAT Detection Using HTTP Access Logs", 2016 IEEE International Workshop on Information Forensics and Security (WIFS), Dec. 4-7, 2016, Abu Dhabi, United Arab Emirates, DOI: 10.1109/WIFS.2016.7823896, 6 pages.

S. Chaudhari, et al., "User and Device Tracking in Private Networks by Correlating Logs: A System for Responsive Forensic Analysis", 2014 Fourth International Conference on Communication Systems and Network Technologies (CSNT), Apr. 7-9, 2014, Bhopal, India, DOI: 10.1109/CSNT.2014.253, 6 pages.

* cited by examiner

CLIENT DEVICE TRACKING

TECHNICAL FIELD

The present disclosure relates to tracking client devices in a network.

BACKGROUND

As network technology has advanced, it has become easier to connect a variety of client/user devices (e.g. desktop computers, laptop computers, tablet computers, mobile phones, etc.) to enterprise networks. Many enterprises now employ "bring your own device" policies that allow employees, guests, or other users to connect their own client devices to the enterprise network. As a result, it is now common for users to, at a given time, connect to an enterprise network via a number of different client devices (i.e., a user may concurrently use multiple network connected devices).

DESCRIPTION OF EXAMPLE EMBODIMENTS

Overview

Presented herein are techniques for tracking client devices associated with an authenticated user of a network. In particular, a computing device having connectivity to a network stores one or more existing device models, where each of the one or more existing device models is a representation of a different client device used by a first authenticated user to access the network. The computing device obtains a device sample, which comprises network traffic data that is captured during a period of time and which is generated by a particular client device associated with the authenticated user of the network. The computing device determines, based on one or more relational criteria, whether the device sample should be assigned to one of the one or more existing device models or to an additional device model that has not yet been created. The computing device then determines relative identity of the particular client device based on whether the device sample is assigned to one of the one or more device models or to an additional device model that has not yet been created.

EXAMPLE EMBODIMENTS

Figure 1:
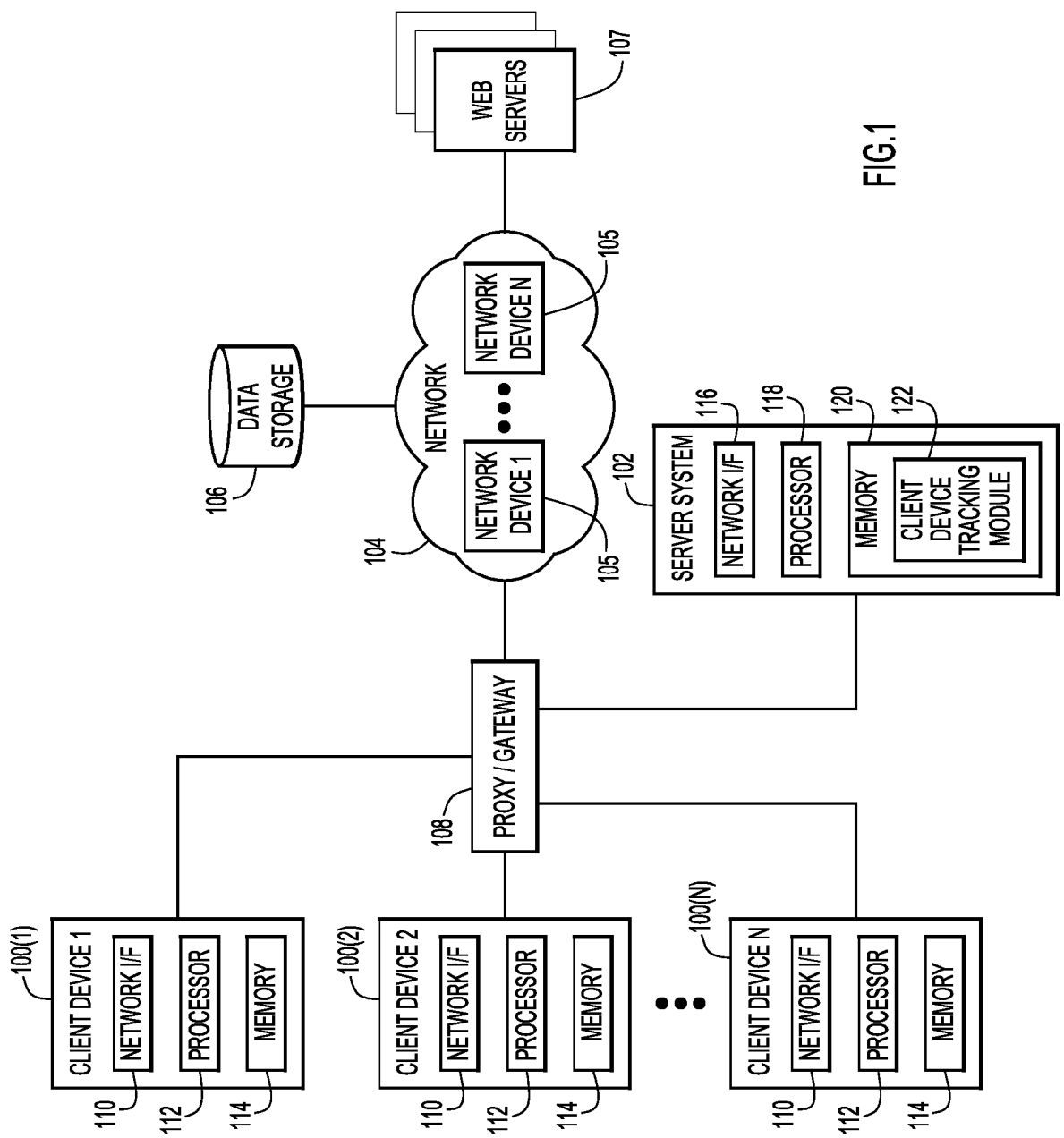
FIG. 1 is a block diagram of a network system environment configured to employ client device tracking techniques, according to an example embodiment.

Referring first to FIG. 1, shown is an example network environment configured to implement the client device tracking techniques presented herein. The network environment includes a plurality of client devices 100(1)-100(N), at least one server systems 102, at least one data storage 106, a plurality of web servers 107, and a web proxy/gateway 108. Also shown in FIG. 1 is a network 104 that includes one or more network devices 105 configured to allow one or more of the client devices 100(1)-100(N), server system 102, data storage 106, and/or web servers 107 to communicate with each other. The network 104 may comprise/include a wide area network (WAN), one or more local area networks (LANs), wireless networks, etc.

The data storage 106 may be any conventional storage system, including one or more databases. The web servers 107 are computing devices that store, process, and deliver web pages to the client devices 100(1)-100(N) using the Hypertext Transfer Protocol (HTTP). The web proxy 108 is a computing device (e.g., server) running an application that operates as an intermediary for network traffic sent between the client devices 100(1)-100(N) and the web servers 107. The web proxy 108 is configured to, among other operations, operate as a data collection point for data related to the network traffic sent between the client devices 100(1)-100(N) and the web servers 107. In certain examples, this data, sometimes referred to herein as network traffic data, comprises Hypertext Transfer Protocol (HTTP) proxy logs, which may include visited domains, visited hostnames, used User-Agent strings, or other information extracted from the user's access of the web servers 107.

Server system 102 and client devices 100(1)-100(N) may be embodied by any type of computer device or system. In the depicted embodiment, each client device 100(1)-100(N) includes a network interface 110, at least one processor 112, and a memory 114. Similarly, the server system 102 includes a network interface 116, at least one processor 118, and a memory 120. The client devices 100(1)-100(N) and server system 102 may also include a display or monitor and any of a number of different types of input devices, such as a keyboard, a mouse, a touchpad, a touchscreen, etc.

The processors 112, 118 are, for example, one or more microprocessors or microcontrollers that may communicate with the network interfaces 110, 116, respectively. Memory 114 and 120 store software instructions that may be executed by the respective processors 112, 118. In other words, memory 114 and/or memory 120 may include instructions, that when executed by one or more processors, cause the one or more processors to carry out the operations described herein with reference to client devices, servers, etc.

Memory 114 and the memory 120 may each include read only memory (ROM), random access memory (RAM), magnetic disk storage media devices, optical storage media devices, flash memory devices, electrical, optical or other physical/tangible (e.g., non-transitory) memory storage devices. Thus, in general, the memory 114 and the memory 120 may each be or include one or more tangible (non-transitory) computer readable storage media (e.g., a memory device) encoded with software comprising computer executable instructions.

In the example of FIG. 1, the server system 102 includes a client device tracking module 122, which is embodied by software instructions stored in memory 120 of the server system 102. That is, the client device tracking module 122 includes instructions that, when executed by the at least one processor 118, are configured to cause the at least one processor to perform the client device tracking techniques described herein. Although FIG. 1 illustrates the client device tracking module 122 at server system 102, it is to be appreciated that in other examples the client device tracking module 122 may be implemented across any number of server systems 102, the web proxy 108, or other devices. It is also to be appreciated that in other examples the client device tracking module 122 can be implemented by any combination of software and/or hardware.

In the example of FIG. 1, an individual/person (i.e., user) uses one or more of the client devices 100(1)-100(N) to access the web servers 107 via the network 104. However, before the user is granted access to the network 104 (i.e., before connecting a client device to the network), the user is first "authenticated" via some form of log-in process. That is, a user first logs into the network 104 by entering one or more user-specific credentials (e.g., one or more of a username/user identification (ID), password, etc.) at a client device and the user (and client device) is granted or denied access to the network 104 based on the entered credentials. If granted access to the network 104, based on proper credentials, the user is referred to as being an "authenticated user" and all network traffic (e.g., HTTP traffic) to/from the client device will include an identification of the authenticated user. For ease of illustration, examples are described herein with reference to the use of a "username" as the identification of an authenticated user in the network traffic. It is to be appreciated that, as used herein, a "username" broadly refers to any identification of an authenticated user in network traffic and that the "username" can have a variety of different forms.

A number of different techniques and/or devices can be used to authenticate a user. For example, the web proxy 108 can authenticate the user, one or more other services (e.g., an identity service engine) that are used with the web proxy can authenticate the user, etc. In addition, a user may be concurrently authenticated at a plurality of different client devices. That is, a user can log into and access the network 104 using different client devices at the same time. In the examples presented herein, client devices at which a user has been authenticated, and that are used to connect to the network 104, are sometimes referred to herein as being network-connected client devices.

In accordance with the techniques presented herein, the client device tracking module 122 is configured to "track" the network-connected client devices that are associated with a user (i.e., to track the client devices that a user is using to access the network 104). More specifically, as described further below, the client device tracking module 122 is configured to obtain and analyze network traffic data (e.g., HTTP proxy logs) associated with (i.e., sent to/from) a particular network-connected client device that is associated with a particular authenticated user. Based on this analysis, the client device tracking module 122 is configured to determine whether the particular network-connected client device (i.e., the device associated with the analyzed network traffic data) is a known (previously-identified) client device or a known (i.e., newly identified) client device. As such, the client device tracking module 122 can use the network traffic data to determine the different network-connected client devices associated with an authenticated user and, accordingly, monitor the use of those client devices by the user over time.

Tracking the use of specific network-connected client devices over time may be useful for a number of different reasons. In one illustrative arrangement, tracking the network-connected client devices that are associated with a user may enable more precise modeling of the behavior of the user (i.e., the user will generally have different behavior on different client devices, such as a laptop, mobile phone, etc.). Network behavioral models are used in many network intrusion detection and network management systems and, when there are multiple devices used by a single user, behavioral models built upon only the user identity would learn from incorrect information with serious impact on the efficacy. For example a behavioral model of a user using a Windows® based laptop and iPhone® at the same time would learn from a mixture of two different behaviors as these devices have completely different network footprints. Windows is a registered trademark of Microsoft Corporation and iPhone is a registered trademarks of Apple Inc. This significantly reduces the detection efficacy of small deviations from the modelled normal behavior that are needed for malware detection. On the other hand, the ability to identify and track the individual user's devices, enables the generation of specialized behavioral profiles and, as such, the ability to detect even small anomalies that can be related to, for example, malware infection. The client device tracking techniques presented herein can be used to detect unauthorized devices or track the infected devices in the network. These examples are merely illustrative and the client device tracking techniques presented herein may have a number of other different purposes.

Figure 2:
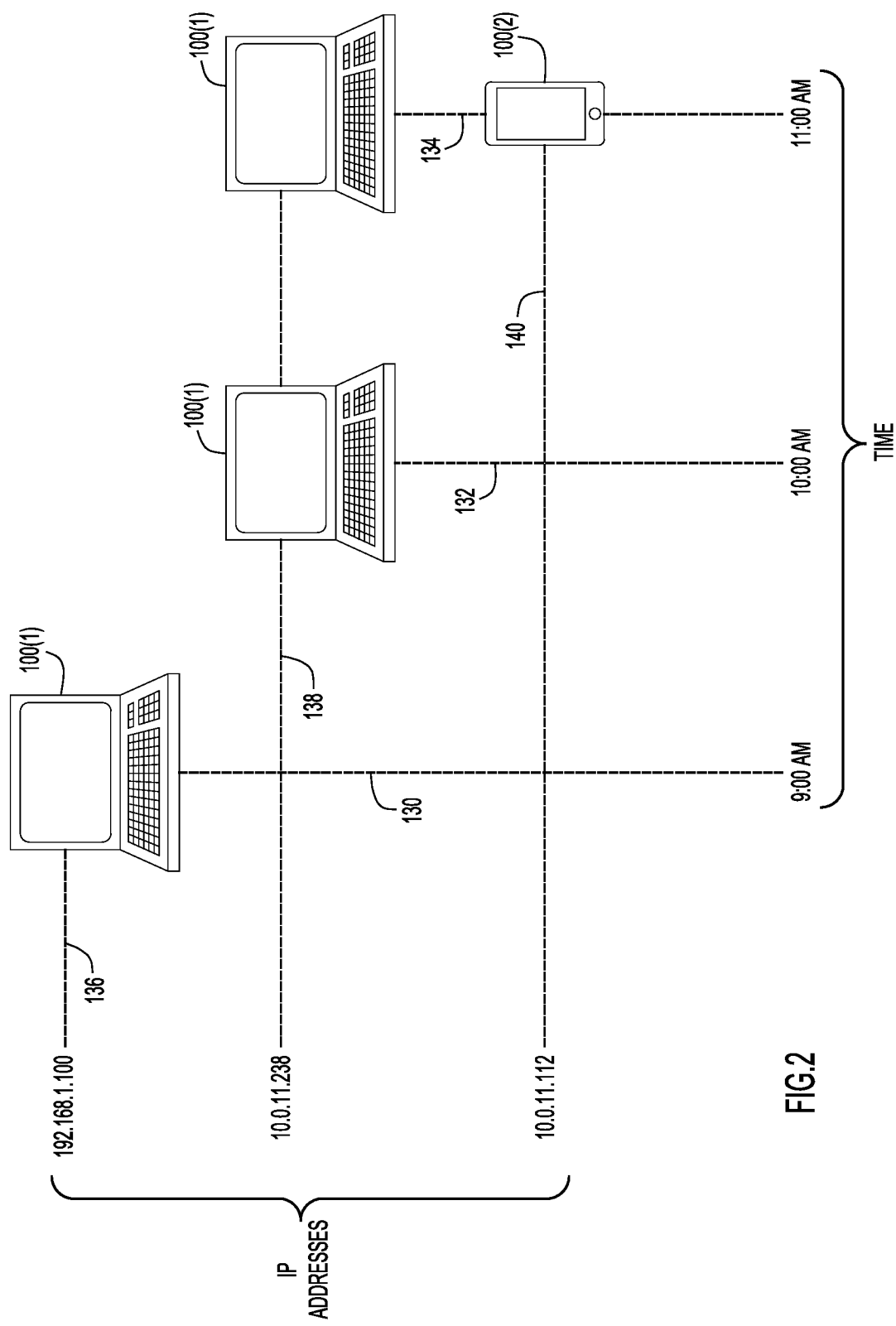
FIG. 2 is a schematic diagram illustrating the tracking of client devices that are associated with an authenticated user at different points in time, according to an example embodiment.

FIG. 2 is a schematic diagram illustrating further details of the client device tracking techniques presented herein. For ease of description, FIG. 2 will be generally described with reference to the arrangement of FIG. 1 and, more specifically, with reference to client device 100(1) as a laptop and client device 100(2) as a mobile phone. FIG. 2 illustrates that the user is authenticated at the laptop 100(1) and mobile phone 100(2) and that each are used by the user to access web servers 107, via network 104, at different points in time. In particular, FIG. 2 illustrates three points of time, namely 9:00 AM, 10:00 AM, and 11:00 AM, represented by dashed lines 130, 132, and 134, respectively. FIG. 2 also illustrates the Internet Protocol (IP) addresses, represented by dashed lines 136, 138, and 140, associated with the laptop 100(1) or mobile phone 100(2) at each of the different points in time.

In FIG. 2, the user employs/uses laptop 100(1) from 9:00 AM 10:00 AM (i.e., between time points 130 and 132) to access the web servers 107. During this time period, the laptop 100(1) is assigned IP address "192.168.1.100." At 10:00 AM (time point 132), the user continues to use laptop 100(1), but the IP address of the laptop 100(1) changes to "10.0.11.238" (e.g., the user disconnects from a wired connection and connects to network 104 through a wireless connection). At 11:00 AM (time point 134), the user also connects mobile phone 100(2) to network 104 via a wireless connection and the mobile phone is assigned IP address "10.0.11.112." The user then proceeds to use mobile phone 100(2) to access the web servers 107. As such, in the network traffic data (e.g., HTTP proxy logs), the client device tracking module 122 (FIG. 1) observes that the user is communicating on IP address "192.168.1.10" from 9:00 AM to 10:00 AM, then on IP address "10.0.11.238" from 10:00 AM to 11:00 AM, and then concurrently communicating on IP addresses "10.0.11.238" and "10.0.11.112" at 11:00 AM.

As noted above, the network traffic data includes the username of the authenticated user. As such, since the client device tracking module 122 also observes the IP addresses of the laptop 100(1) and the mobile phone 100(2), the client device tracking module 122 is able to associate the observed IP addresses with the authenticated user (i.e., the observed IP addresses are known to correspond with the user). However, as shown in FIG. 2, the IP address on which a client device communicates can change and the IP address alone cannot be used to track the client devices. To solve this problem, the client device tracking module 122 is configured to analyze additional information contained the network traffic data to determine the true number and types of client devices that the user is using to access the network 104. That is, the client device tracking module 122 is able to track client devices over different IP addresses as assigned by, for example, the Dynamic Host Configuration Protocol (DHCP) server. The client device tracking techniques presented herein are useable even in the case of a user having multiple devices of the same type (e.g., two mobile phones from the same manufacturer).

For simplicity, further details of the client device tracking techniques are described herein with reference to data of only a single user. To further simplify the description of the client device tracking techniques, the description uses two terms, namely "device sample" and "device model." A "device sample" is a set of network traffic data (e.g., HTTP proxy logs) generated over a predefined/predetermined period of time (e.g., 5 minutes, 10 minutes, 1 hour, etc.) that share the same username and source IP address. A "device model" is a model of a particular client device that contains the last observed IP address of the particular client device and other information extracted from device samples corresponding to the particular client device. The device model may include, for example, one or more sets of User-Agent strings previously used by the particular client device, one or more sets of hostnames contacted by all the particular device samples, operating system (OS) family of the particular device, and/or other device specific features. Once created, a device model is referred to herein as being "linked" to a particular client device that is known to (i.e., has been previously identified by) the client device tracking module 122.

Figure 3:
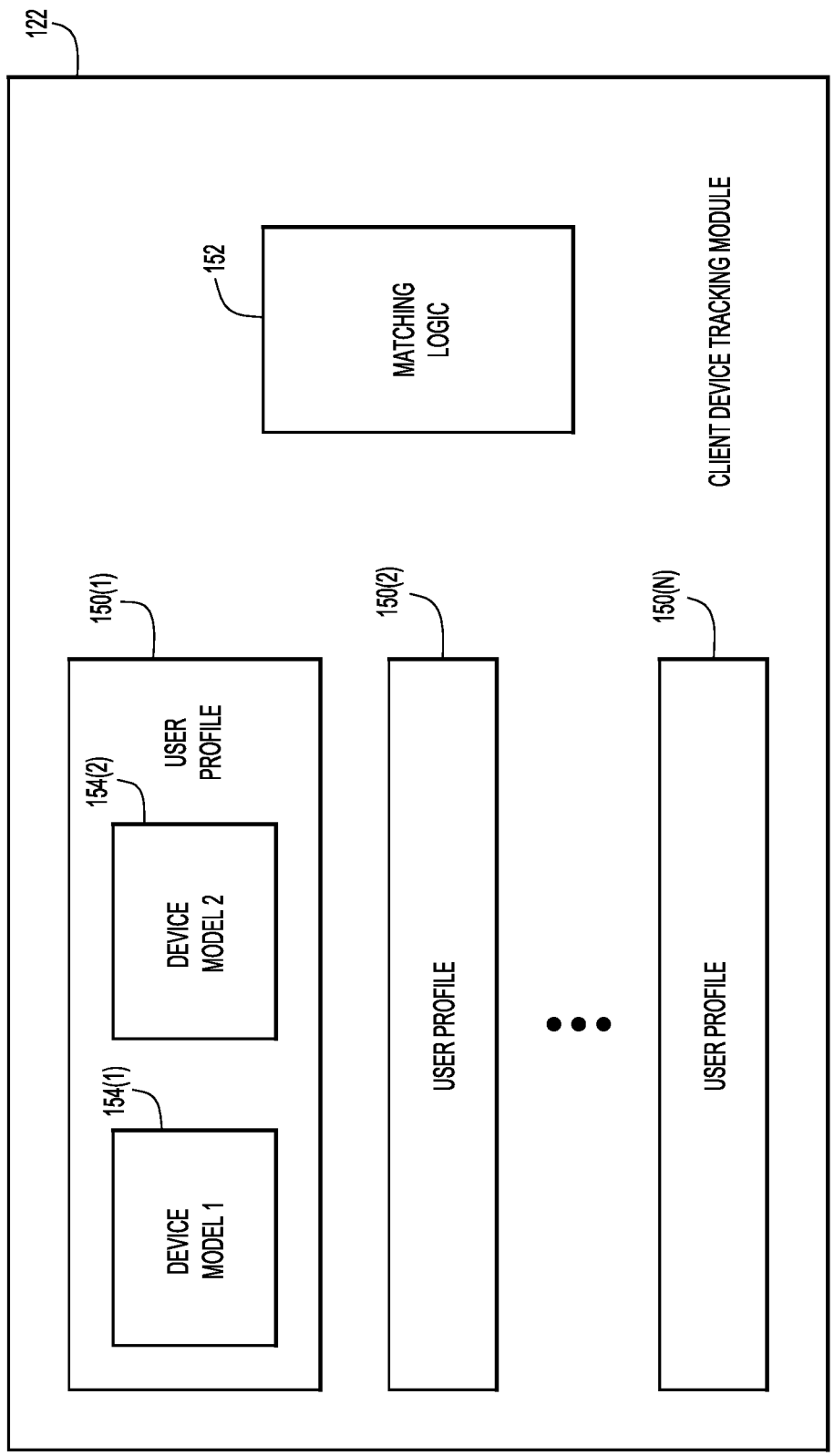
FIG. 3 is a functional block diagram illustrating a client device tracking module, according to an example embodiment.

FIG. 3 is a functional block diagram of client device tracking module 122 in accordance with examples presented herein. For ease of illustration, FIG. 3 is described with continued reference to the examples of FIGS. 1 and 2. As shown, the client device tracking module 122 includes a plurality of user profiles 150(1)-150(N) that are each associated with one of a plurality of individuals/persons (i.e., users) who have access to the network 104. As noted, in accordance with examples presented herein, users are authenticated to the network 104, meaning that the users are granted access to the network upon entering a specific username (or other user-specific access credentials). As such, each user profile corresponds to a specific user, identified by a unique username (i.e., there is a 1:1 correspondence between users and user profiles).

In general, each user profile 150(1)-150(N) includes one or more device models that are built based on network traffic data that includes the associated unique username. For ease of illustration, FIG. 3 only illustrates the details of user profile 150(1), which corresponds to the user of laptop 100(1) and mobile phone 100(2) in FIG. 2. User profile 150(1) includes two device models 154(1) and 154(2), which are associated with laptop 100(1) and mobile phone 100(2), respectively.

As noted, the device models 154(1) and 154(2) may include a variety of different types of information associated with the laptop 100(1) and mobile phone 100(2), respectively. For example, the device models 154(1) and 154(2) may identify the last source IP address observed for the corresponding client device (i.e., laptop 100(1) and mobile phone 100(2), respectively). In addition, the device models 154(1) and 154(2) may include other information extracted from device samples corresponding to laptop 100(1) and mobile phone 100(2), such as one or more set of all User-Agent strings previously used by the particular client device, set of hostnames contacted by all the particular device samples, OS family, etc.

As described further below, device models, such as device models 154(1) and 154(2), are initially built when the linked/corresponding client device is first used to access network 104 (i.e., when the client device is first identified and becomes known to the client device tracking module 122). The device models are the updated as the corresponding client device is subsequently used by the user. As such, FIG. 3 illustrates an example in which laptop 100(1) and mobile phone 100(2) have both been previously used by the user to connect to network 104 and, as such, each is linked to a device model 154(1) and 154(2), respectively.

The client device tracking module 122 also comprises matching logic 152 that, when executed by processor 118, enables the client device tracking module 122 to determine whether an observed/captured device sample was generated by one of a user's known (previously identified) client devices already seen in the network traffic or whether the user has started to use an additional (unknown/unidentified) client device. That is, the client device tracking module 122 is configured to determine whether the observed device sample belongs to (should be assigned to) some already established device model of the authenticated user or whether an additional device model should be created. The client device tracking module 122 makes this determination by analyzing the observed device sample in accordance with a number of different relational/matching criteria/rules. For ease of description, application of the relational criteria by the client device tracking module 122 is described with reference to the examples of FIGS. 2 and 3. It is be appreciated the following sequence/order in which the relational criteria are used to evaluate/analyze a device sample is illustrative and that the relational criteria may be evaluated in a number of different orders, combinations, etc.

In one example, the client device tracking module 122 determines whether an observed device sample includes a source IP address that matches the IP address that was last observed as being used by laptop 100(1) or mobile phone 100(2). That is, the source IP address in the observed device sample, which is consistent for the entire sample since the sample comprises network traffic data from a single client, is compared to the source IP addresses included in each of the device models 154(1) and 154(2). As noted above, device models 154(1) and 154(2) include an identification of the last source IP address observed for the linked/corresponding client device (i.e., the last source IP address for laptop 100(1) and mobile phone 100(2), respectively). If the source IP address in the observed device sample matches the source IP address in either of the device models 154(1) and 154(2), then the device sample is associated with that device model (i.e., the model that includes the matching IP address) and the corresponding particular client device linked to the device model. In other words, the client device that generated the device sample is identified as the same client device as the particular client device linked to the matching device model.

As described further below, the client device tracking module 122 may be configured to execute an operating system (OS) family detection method to identify the OS family associated with a device sample. Before associating a device sample with a device model, the client device tracking module 122 is configured to compare the OS family of the device sample to the OS family of a device model. If the OS family of the device sample is discrepant from the OS model, then device sample cannot be assigned to that device model. In other words, the OS family comparison operates as a secondary validation before a device sample is associated with device model.

In certain examples, two device samples with different source IP addresses may be observed during overlapping/ concurrent time periods. If two IP addresses are active at the same time, then the associated device samples cannot be assigned to the same device model. That is, the client device tracking module 122 is configured to prevent concurrent device samples, with different source IP addresses, from being associated with the same device model.

As noted, the client device tracking module 122 may be configured to execute an OS family detection method to identify the OS family associated with a device sample. If two device samples with different associated OS families are observed during overlapping/concurrent time periods, then the associated device samples cannot be assigned to the same device model. That is, the client device tracking module 122 is configured to prevent concurrent device samples, with different associated OS families, from being associated with the same device model.

If the above criteria fail to result in a device sample being associated with a device model, then the client device tracking module 122 is configured to evaluate one or more similarities (i.e., compute and analyze one or more similarity measures) between the observed device sample and each of the existing device models to determine whether the observed device sample should be assigned to one of the existing device models or to an additional device model that has not yet been created. In certain examples, the similarity is calculated as a highest/maximum similarity of a "User-Agent String Similarity" between the observed device sample and the device models and a "Visited Hostnames Similarity" between the observed device sample and the device model. If the maximum of these two similarities is below a predefined threshold (e.g., zero), then the client device tracking module 122 determines that the observed device sample should not be associated with any of the existing device models and the client device tracking module 122 creates an additional (new) device model to which the observed device sample is associated.

In other words, the one or more similarity measures are used to assign the device sample, and thus the client device that generated the observed device sample, to the "most similar" device model. If the client device tracking module 122 cannot find a "similar" model (i.e., similarity is zero or below a threshold level), then the client device tracking module 122 determines that the observed device sample was generated by a previously unidentified/unknown client device and that an additional device model (linked to the previously unknown client device) should be created. In this way, the client device tracking module 122 can determine a "relative identity" of the client device that generated the observed device sample. As used herein, the "relative identity" of the client device that generated the device sample is a determination as to whether the client device that generated the device sample is the same device as one of the client devices linked/corresponding to a device model (i.e., a known client device) or is an additional (unknown) device. The User-Agent String Similarity and the Visited Hostnames Similarity are each described further below.

As noted, above the above order in which the relational criteria are used to evaluate a device sample is illustrative and that the relational criteria may be evaluated in a number of different orders, combinations, etc. For example, in certain embodiments the client device tracking module 122 may be configured to only evaluate one or more similarities between the observed device sample and each of the device models. In other embodiments, the client device tracking module 122 may be configured to first one or more similarities and utilize the above or other relational criteria to confirm to validate the association of a device sample to a device model.

User-Agent String Similarity

Individual client devices typically use a static set of User-Agent (UA) strings in certain types of network traffic, specifically HTTP request headers. User-Agent strings includes a variety of information about the associated traffic. For example, the User-Agent string may identify the program that was used to create the HTTP request, can include information about the browser, operating system, plug-ins, etc. Addition, User-Agent strings are relative long strings of information and are relatively specific/unique to users and devices and can change based on a wired or wireless connection and other factors. The inventors of the present application have discovered that a client device that migrates from a first IP address to a second IP address can be identified through the use of the sets of User-Agent strings observed in the traffic from both IP addresses. The inventors have also discovered that a simple comparison of these sets with exact string matching (e.g., Jaccard index of the sets) is insufficient as it is not able to correctly join device samples in the cases when the client device is used differently on the individual IP addresses. For example, if the user is browsing the Internet on IP address 1, then the device samples may include User-Agent strings of the Internet browser. If the user then shows a presentation on IP address 2, then the device samples may include User-Agent strings of, for example, Microsoft® PowerPoint update agent. The User-Agent String Similarity in accordance with the techniques presented exploits the fact that there are some User-Agent strings that typically do not occur together (e.g., User-Agent strings of Safari and Internet Explorer) and, on the other hand, that there are other User-Agent strings that have a high probability of co-occurrence (e.g., certain versions of Outlook and PowerPoint, which should have the same versions of individual extensions).

In view of the above, the User-Agent String Similarity in accordance with the techniques presented is a similarity measure that uses a co-occurrence probability dataset (e.g., graph) that is created offline from previously observed network traffic data. In one example, the co-occurrence probability dataset is constructed so each User-Agent string represents a vertex and such that there is an edge in between two vertices when the vertices' User-Agent strings were both seen in at least one device sample (i.e., there was an observed co-occurring between the User-Agent string in at least one device sample). If some User-Agent strings are "co-occurring," then they can appear on the same device at different times. As such, the co-occurrence probability dataset represents a metric of which User-Agent strings on appear on the same device at different times. Additionally, an empirical probability of each of the User-Agent string is calculated offline from the same dataset. The User-Agent String Similarity of two User-Agent string sets $U_1$ and $U_2$ is then calculated as below in Equation 1.

$$\text{sim}(U_1, U_2) = f(\text{sum}_{u \text{ in } U_1} \text{sum}_{v \text{ in } U_2} \text{Cooccur}(u, v) * p(u) * p(v)),\qquad\text{Equation 1:}$$

where $U_1$ is the a set of User-Agent strings from the device model, $U_2$ is a set of device agents from an observed device sample that is to be associated with a device model, and $p(u)$ and $p(v)$ probabilities that are obtained from co-occurrence probability dataset. The function $p(x)$ is an empirical probability of a "User-Agent x," as described above. As such, p(u) is the empirical probability of the "User-Agent u" and p(v) the empirical probability of "User-Agent v."

In Equation 1, the Coocur(u,v) is equal to 1 if u=v or there is an edge in the dataset (graph) between u and v and −1 otherwise. The $f$ function transforms the result into [0,1] range f(x)=(x+1)/2. The probabilities p(u) and p(v) assure that co-occurrence or lack of co-occurrence of two common User-Agent strings will have higher impact than co-occurrence or lack of co-occurrence of low probability User-Agent strings, which are generally less relevant.

In other words, the User-Agent String Similarity is used to measure the similarity between the set of User-Agent strings in a device sample and the set of User-Agent strings in a device model, wherein the similarity is weighted based on known User-Agent string probabilities. As noted, the co-occurrence probabilities are predetermined and learned based on previously observed network traffic data. In addition, the similarity is based on common (predetermined) co-occurrences of User-Agents (i.e., co-occurrences patterns that have been previously observed).

The User-Agent String Similarity approach described above is more efficient than parsing the User-Agent strings to compare the versions of User-Agent extensions as there are lot of problems caused by various compatibility modes of the browsers and the high number of User-Agent string with no extension definitions (e.g., specific programs) that cannot be compared.

Visited Hostnames Similarity

Since it is likely that only certain types of devices visit certain websites, a client device can also be identified based on a set of hostnames that are typically visited from the client device. For example, a client device running a Windows-based operating system will often contact the Windows update server, but it is unlikely that the same server will be contacted from a client device running a MAC-based operating system. Similarly, mobile devices (e.g., iPhone, Android-based phones, etc.) will tend to visit mobile versions of many web sites (e.g., a version of page optimized for viewing from a mobile device), which can help to distinguish the mobile devices from laptop computers, desktop computers, etc. This is also applicable to client devices with the same operating system, but different versions thereof as there are typically hostnames that are contacted by only a specific version of the operating system.

The Visited Hostnames Similarity in accordance with the techniques presented builds on the above concepts by using a predefined set (H) of hostnames that are considered indicative for different types of devices. The predefined set (H) can, for example, different update servers (e.g., Microsoft update servers, Apple update servers, etc.), and/or other types of hostnames. Each device model includes n value representing a probability for each hostname from H that the given client device will visit the hostname in one time period. In the context of update servers, the probability may be an "update estimation probability" for each update server from H that the given client device will visit the hostname in one time period. When the client device tracking module 122 calculates the Visited Hostnames Similarity between an observed device sample s and the given device model m, the client device tracking module 122 extracts a set of visited hostnames, denoted as $H_s$, from the device sample s and computes the likelihood of $H_s$, given the probability of hostnames visits estimated for the given device model m.

More specifically, p(h|m) is denoted as the estimation of probability that a hostname h is visited in one time period from the client device which is modelled by the particular device model m. Then the similarity between a device sample s and the device model m is computed as shown below in Equation 2.

$$\text{sim}(s,m) = f(\text{sum}_{h \text{ in } H} \log(\text{Prob}(h))), \quad \text{Equation 2:}$$

where Prob(h) is equal to p(h|m) if h is in $H_s$ and to "1−p(h|m)" if h is not a member of $H_s$, and $f$ is a function which transforms the log-likelihood to a desired range such as, for example, the exponential function, the identity function, etc.

In other words, the Visited Hostnames Similarity is used a measure representing the similarity between a device sample and a device model based on a calculated probability that a set of hostnames visited by a client device (extracted from the device sample) are visited by the client device linked/corresponding to the device model.

Operating System Family Identification

As noted, the client device tracking module 122 may be configured to execute an operating system (OS) family detection method to identify the OS family associated with a device sample. The operating system identification is used during the device sample association process, as described above, to assure that the method is not by any chance merging devices of different operating system families. The operating system family is inferred from the User-Agent strings using publicly available database. The operating system family is assigned according to the most frequently inferred operating system from all associated User-Agent strings (in the device sample or the device model).

Additionally, when the User-Agent string are not available a similar approach to one described in "Similarity of Visited hostnames" section can be used to also infer the most probable operating system family and to differentiate two different devices that have the same operating system family. More specifically, similarly to how the probability of visiting hostnames from the predefined set H can be estimated for device models, a probability can be also estimated off-line for individual operating system families. This can be performed using labelled data for which the true operating system is known and can be used beforehand for training of the estimation. When these probabilities are estimated, the similarity computation presented in Equation 2 can be used to determine similarity between an operating system family and a device model or device sample. The operating system family with the highest similarity is then assigned to the given model/sample.

Figure 4:
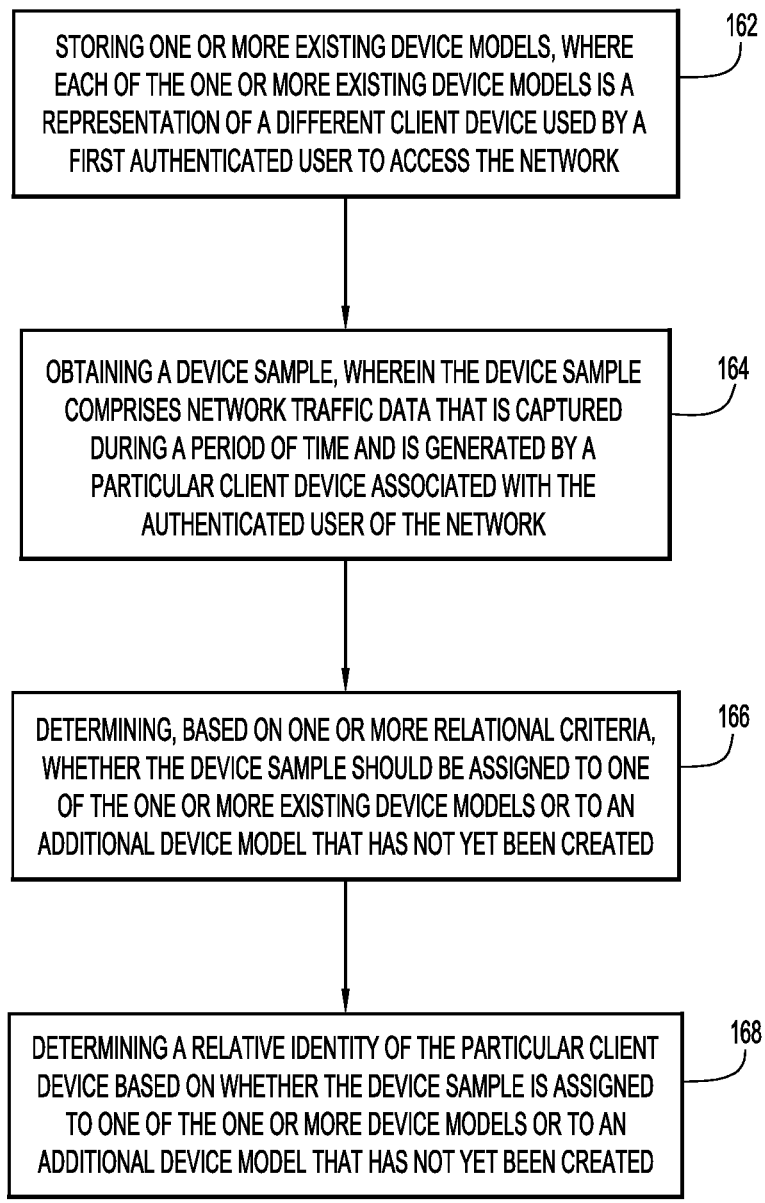
FIG. 4 is flowchart of a method for client device tracking, according to an example embodiment.

FIG. 4 is a flowchart of a method 160 in accordance with examples presented herein that is performed by a computing device (e.g., a web proxy, a server system, etc.) that has connectivity to a network. Method 160 begins at 162 where the computing device stores one or more existing device models, where each of the one or more existing device models is a representation of a different client device used by a first authenticated user to access the network. At 164, the computing device obtains a device sample, wherein the device sample comprises network traffic data that is captured during a period of time and is generated by a particular client device associated with the authenticated user of the network. At 166, the computing device determines, based on one or more relational criteria, whether the device sample should be assigned to one of the one or more existing device models or to an additional device model that has not yet been created. At 168, the computing device determines relative identity of the particular client device based on whether the device sample is assigned to one of the one or more device models or to an additional device model that has not yet been created. (i.e., determines whether the particular client device is one of the different client devices corresponding to the device models or is an additional unknown device).

As described above, presented herein are techniques to identify and track, over time, the client devices of an individual user based on network traffic data (e.g., HTTP proxy logs). That is, the techniques presented herein use only information available in HTTP proxy logs to effectively identify and track client devices. In general, the client device tracking techniques operate without human intervention or pre-training using labeled data to be able to effectively and precisely identify all of the client devices of a user. The client device tracking techniques presented herein can be used for a number of different purposes such as, for example, to improve behavioral models typically used in intrusion detection systems (e.g., more precise device-specific models, rather than models based on all of a user's devices), to detect unauthorized devices in the network, to detect various device-related policy violations (e.g., caused by accessing private network services via unauthorized device), etc. As a result, the techniques presented herein may be used to increase the speed or, and/or reduce costs of, network security incident investigations as the analyst will know the exact client device that caused the incident.

In one form, a method performed at a computing device having connectivity to a network is provided. The method comprises: storing one or more existing device models, where each of the one or more existing device models is a representation of a different client device used by a first authenticated user to access the network; obtaining a device sample, wherein the device sample comprises network traffic data that is captured during a period of time and is generated by a particular client device associated with the authenticated user of the network; determining, based on one or more relational criteria, whether the device sample should be assigned to one of the one or more existing device models or to an additional device model that has not yet been created; and determining a relative identity of the particular client device based on whether the device sample is assigned to one of the one or more device models or to an additional device model that has not yet been created.

In another form, an apparatus is provided. The apparatus comprises: at least one network interface having connectivity to a network; at least one memory; and a processor coupled to the at least one network interface and the at least one memory, and configured to: store one or more existing device models in the memory, where each of the one or more existing device models is a representation of a different client device used by a first authenticated user to access the network, obtaining a device sample, wherein the device sample comprises network traffic data that is captured during a period of time and is generated by a particular client device associated with the authenticated user of the network, determine, based on one or more relational criteria, whether the device sample should be assigned to one of the one or more existing device models or to an additional device model that has not yet been created, and determine a relative identity of the particular client device based on whether the device sample is assigned to one of the one or more device models or to an additional device model that has not yet been created.

In another form, one or more non-transitory computer readable storage media at a computing device having connectivity to a network are provided. The one or more non-transitory computer readable storage media are encoded with instructions that, when executed by a processor, cause the processor to: store one or more existing device models, where each of the one or more existing device models is a representation of a different client device used by a first authenticated user to access the network; obtain a device sample, wherein the device sample comprises network traffic data that is captured during a period of time and is generated by a particular client device associated with the authenticated user of the network; determine, based on one or more relational criteria, whether the device sample should be assigned to one of the one or more existing device models or to an additional device model that has not yet been created; and determine a relative identity of the particular client device based on whether the device sample is assigned to one of the one or more device models or to an additional device model that has not yet been created.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a computing device having connectivity to a network:
      storing one or more existing device models in a user profile of a first authenticated user, where each of the one or more existing device models is a representation of a behavior of a client device that is associated with and is used by the first authenticated user to access the network;
      obtaining a device sample, wherein the device sample comprises network traffic data that is captured during a period of time and is generated by a particular client device associated with the first authenticated user of the network;
      determining whether the device sample should be assigned to one of the one or more existing device models or to an additional device model that has not yet been created by computing one or more similarity measures between the device sample and each of the one or more existing device models based on one or more relational criteria that includes one or more of: a time period, a source Internet Protocol address, an operating system family, a set of User-Agent strings, or a visited hostname; and
      determining a relative identity of the particular client device based on whether the device sample is assigned to one of the one or more existing device models or to the additional device model that has not yet been created.

2. The method of claim 1, wherein the determining whether the device sample should be assigned to the one of the one or more existing device models or to the additional device model that has not yet been created, comprises:
   analyzing the one or more similarity measures to determine whether the device sample should be assigned to the one of the one or more existing device models or to the additional device model that has not yet been created.

3. The method of claim 2, wherein computing the one or more similarity measures between the device sample and each of the one or more existing device models comprises:
   computing a plurality of similarity measures between the device sample and each of the one or more existing device models, and wherein the method further includes:
  storing a plurality of user profiles including the user profile, and each of the plurality of user profiles is associated with a respective user that is authenticated to access the network.

4. The method of claim 2, wherein computing the one or more similarity measures between the device sample and each of the one or more existing device models comprises:
  computing at least one similarity measure between a first set of User-Agent strings in the device sample and a second set of User-Agent strings in each of the one or more existing device models, wherein the at least one similarity measure is weighted based on predetermined User-Agent string probabilities learned from previously observed network traffic data.

5. The method of claim 2, wherein computing the one or more similarity measures between the device sample and each of the one or more existing device models comprises:
  computing a similarity measure between the device sample and each of the one or more existing device models based on a calculated probability that a set of hostnames extracted from the device sample are visited by different client devices linked to each device model.

6. The method of claim 1, wherein the determining whether the device sample should be assigned to the one of the one or more existing device models or to the additional device model that has not yet been created, comprises:
  determining whether the device sample includes a first source Internet Protocol address that matches a second source Internet Protocol address identified in any of the one or more existing device models; and
  if the first source Internet Protocol address in the device sample matches the second source Internet Protocol address identified in any of the one or more existing device models, assigning the device sample to an existing device model that includes a matching source Internet Protocol address.

7. The method of claim 6, wherein before assigning the device sample to the existing device model that includes the matching source Internet Protocol address, the method further comprises:
  determining the operating system family associated with the device sample based on the set of User-Agent strings included in the device sample; and
  comparing the operating system family associated with the device sample to an operating system family associated with each of the one or more existing device models.

8. The method of claim 1, wherein:
  the network traffic data in the device sample comprises a plurality of data samples captured during the period of time that share a username and the source Internet Protocol address,
  the one or more existing device models includes at least a first device model of a first client device associated with the user and a second device model of a second client device associated with the user, and
  the first device model includes a first time period in which the first client device of the user has previously accessed the network and the second device model a second time period in which the second client device of the user has previously accessed the network.

9. The method of claim 1, wherein the network traffic data comprises only information available in Hypertext Transfer Protocol (HTTP) proxy logs and the one or more relational criteria includes the time period, and wherein the method further includes:
  comparing a period of time in which the network traffic data is captured to the time period in the relational criteria to determine whether the device sample should be assigned to the one or the one or more existing device models or to the additional device model that has not yet been created.

10. An apparatus, comprising:
  at least one network interface having connectivity to a network;
  at least one memory; and
  a processor coupled to the at least one network interface and the at least one memory, and configured to:
    store, in a user profile of a first authenticated user, one or more existing device models in the memory, where each of the one or more existing device models is a representation of a behavior of a client device that is associated with and is used by the first authenticated user to access the network,
    obtain a device sample, wherein the device sample comprises network traffic data that is captured during a period of time and is generated by a particular client device associated with the first authenticated user of the network,
    determine whether the device sample should be assigned to one of the one or more existing device models or to an additional device model that has not yet been created by computing one or more similarity measures between the device sample and each of the one or more existing device models based on one or more relational criteria that includes one or more of: a time period, a source Internet Protocol address, an operating system family, a set of User-Agent strings, or a visited hostname, and
    determine a relative identity of the particular client device based on whether the device sample is assigned to one of the one or more existing device models or to the additional device model that has not yet been created.

11. The apparatus of claim 10, wherein to determine whether the device sample should be assigned to the one of the one or more existing device models or to the additional device model that has not yet been created, the processor is configured to:
  analyze the one or more similarity measures to determine whether the device sample should be assigned to the one of the existing device models or to the additional device model that has not yet been created.

12. The apparatus of claim 11, wherein to compute the one or more similarity measures between the device sample and the one or more existing device models, the processor is configured to:
  compute a plurality of similarity measures between the device sample and each of the one or more existing device models,
  wherein the processor is further configured to store a plurality of user profiles including the user profile in the memory, and wherein each of the plurality of user profiles is associated with a respective user that is authenticated to access the network.

13. The apparatus of claim 11, wherein to compute the one or more similarity measures between the device sample and each of the one or more existing device models, the processor is configured to:
  compute at least one similarity measure between a first set of User-Agent strings in the device sample and a second set of User-Agent strings in each of the existing device models, wherein the at least one similarity measure is weighted based on predetermined User-Agent string probabilities learned from previously observed network traffic data.

14. The apparatus of claim 11, wherein to compute the one or more similarity measures between the device sample and the one or more existing device models, the processor is configured to:

compute a similarity measure between the device sample and each of the one or more existing device models based on a calculated probability that a set of hostnames extracted from the device sample are visited by different client devices linked to each device model.

15. The apparatus of claim 10, wherein to determine whether the device sample should be assigned to the one of the one or more existing device models or to the additional device model that has not yet been created, the processor is configured to:

determine whether the device sample includes a first source Internet Protocol address that matches a second source Internet Protocol address identified in any of the one or more existing device models; and if the first source Internet Protocol address in the device sample matches the second source Internet Protocol address identified in any of the one or more existing device models, assign the device sample to an existing device model that includes a matching source Internet Protocol address.

16. One or more non-transitory computer readable storage media at a computing device having connectivity to a network and encoded with instructions that, when executed by a processor, cause the processor to:

store one or more existing device models in a user profile of a first authenticated user, where each of the one or more existing device models is a representation of a behavior of a client device that is associated with and is used by the first authenticated user to access the network;

obtain a device sample, wherein the device sample comprises network traffic data that is captured during a period of time and is generated by a particular client device associated with the first authenticated user of the network;

determine whether the device sample should be assigned to one of the one or more existing device models or to an additional device model that has not yet been created by computing one or more similarity measures between the device sample and each of the one or more existing device models based on one or more relational criteria that includes one or more of: a time period, a source Internet Protocol address, an operating system family, a set of User-Agent strings, or a visited hostname; and determine a relative identity of the particular client device based on whether the device sample is assigned to one of the one or more existing device models or to the additional device model that has not yet been created.

17. The non-transitory computer readable storage media of claim 16, wherein the instructions operable to determine whether the device sample should be assigned to the one of the one or more existing device models or to the additional device model that has not yet been created, comprise instructions operable to:

analyze the one or more similarity measures to determine whether the device sample should be assigned to the one of the existing device models or to the additional device model that has not yet been created.

18. The non-transitory computer readable storage media of claim 17, wherein the instructions operable to compute the one or more similarity measures between the device sample and the one or more existing device models comprise instructions operable to:

compute at least one similarity measure between a first set of User-Agent strings in the device sample and a second set of User-Agent strings in each of the one or more existing device models, wherein the similarity measure is weighted based on predetermined User-Agent string probabilities learned from previously observed network traffic data.

19. The non-transitory computer readable storage media of claim 17, wherein the instructions operable to compute the one or more similarity measures between the device sample and the one or more existing device models comprise instructions operable to:

compute a similarity measure between the device sample and each of the one or more existing device models based on a calculated probability that a set of hostnames extracted from the device sample are visited by different client devices linked to each of the one or more existing device models.

20. The method of claim 1, wherein storing the one or more existing device models includes: storing a first existing device model including a first set of User-Agent strings or a first set of hostnames extracted from a plurality of device samples linked to the first existing device model.

* * * * *